UNITED STATES PATENT OFFICE.

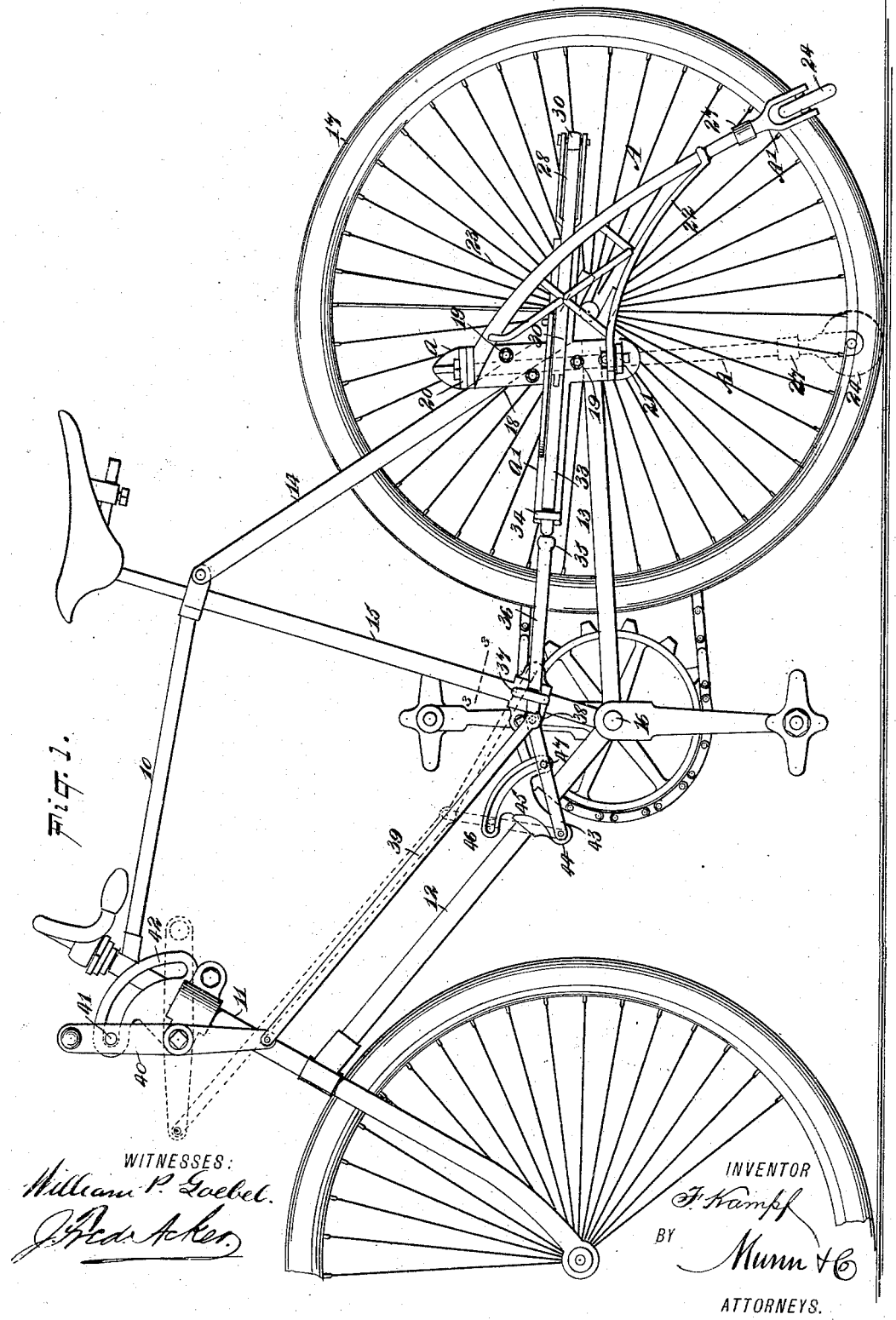

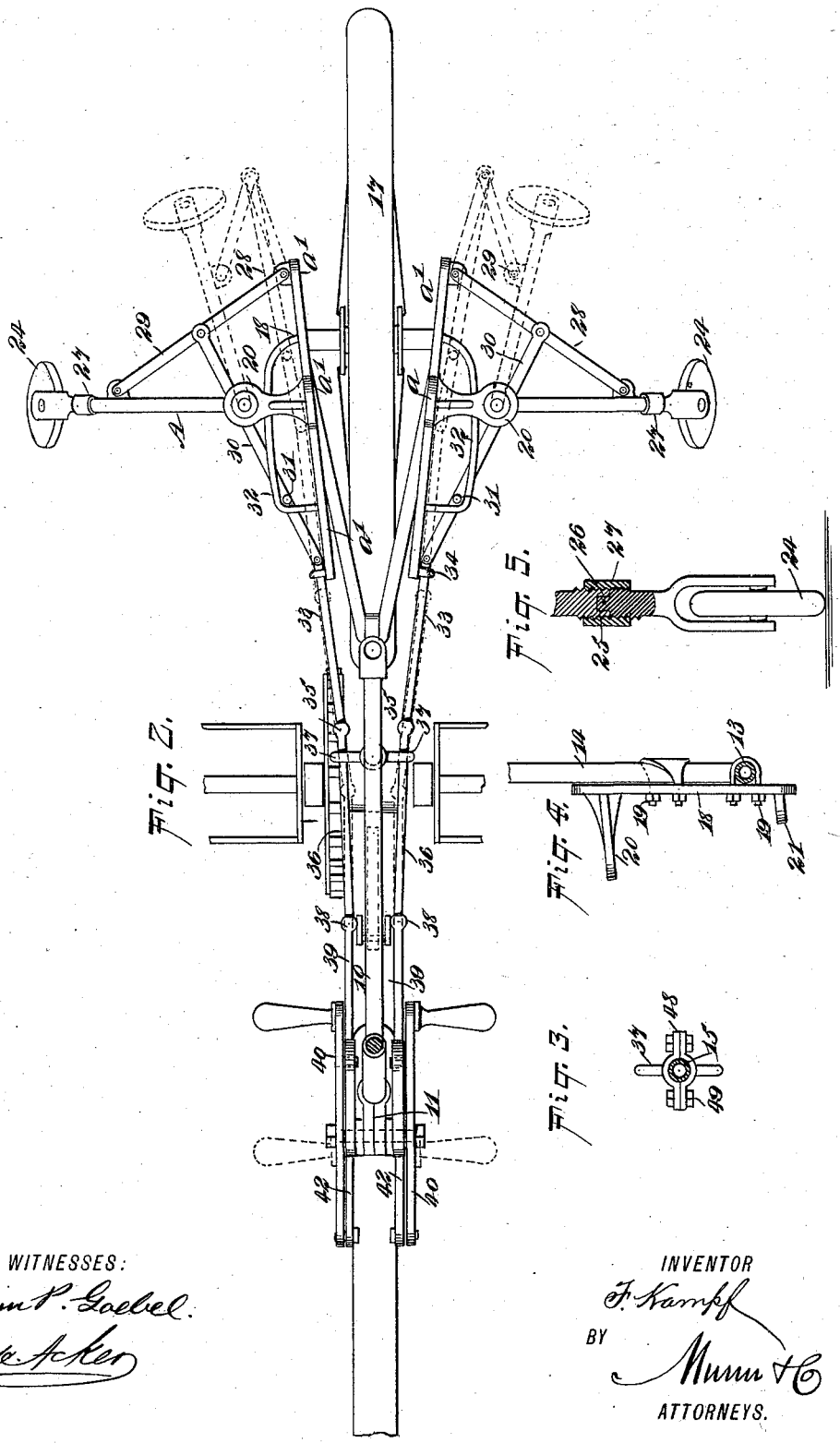

FRANZ KAMPF, OF NEW YORK, N. Y.

ADJUSTABLE REST FOR BICYCLES.

SPECIFICATION forming part of Letters Patent No. 558,815, dated April 21, 1896.

Application filed August 6, 1895. Serial No. 558,405. (No model.)

*To all whom it may concern:*

Be it known that I, FRANZ KAMPF, of New York city, in the county and State of New York, have invented a new and Improved Adjustable Rest for Bicycles, of which the following is a full, clear, and exact description.

My invention relates to an adjustable rest for bicycles; and it has for its object to provide a device adapted to be conveniently operated by the rider of the bicycle, which device may be placed in such position at the will of the rider as to steady the bicycle or hold it in an upright position when at rest, and the device is likewise adapted to steady the bicycle when a beginner is learning to ride to enable him to gain the necessary confidence in the machine.

Another object of the invention is to provide a rest for the bicycle which will enable women to readily mount a bicycle, and also provide means whereby the improved bicycle-rest may be used when necessary to retard the motion of the machine—as, for example, in descending a hill or incline—serving practically as a brake.

Another object of the invention is to provide a means whereby the rest may be carried out of engagement with the ground without the rider dismounting and folded at each side of the rear wheel of the machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a bicycle having the improvement applied thereto. Fig. 2 is a plan view of the bicycle and the improved rest, the said rest being shown in position to support the bicycle. Fig. 3 is a section taken through the center brace of the bicycle-frame, practically on the line 3 3 of Fig. 1. Fig. 4 is a section taken through the rear lower brace, illustrating the manner in which the attaching-plate of a rest-arm is attached to the frame of the bicycle; and Fig. 5 is a detail sectional view of the lower portion of a rest-arm of the machine.

The bicycle-frame may be of any approved construction. In the drawings it comprises an upper brace 10, a steering-post 11, a front lower brace 12, a rear lower brace 13, and a rear upper brace 14, together with a center brace 15, and the pedal-shaft 16 is mounted and placed in the usual manner.

At each side of the rear wheel 17 an attaching-plate 18 is secured to the frame of the machine, preferably to the rear lower brace 13 and the rear upper brace 14, the attachment being made through the medium of clips or their equivalents, the bolts 19 of the clips being shown in Fig. 1.

Each attaching-plate comprises a vertical member $a$ and a horizontal member $a'$, the horizontal member being made to extend beyond each side of the vertical member. At the top portion of the vertical member of each attaching-plate a horizontal bracket-arm 20 is secured or integrally formed with the plate, while at or near the lower end of the aforesaid member of each attaching-plate a shorter horizontal bracket 21 is formed.

Each attaching-plate is adapted to carry a rest-arm A. Each rest-arm is curved in an outwardly direction and is provided with a correspondingly-curved brace 22, which is attached to the lower portion of an arm or made integral therewith and diverges from the upper portion, the brace being pivotally attached to the lower bracket 21, and the upper part of the body portion of the arm is pivotally connected with the upper bracket $a$ of an attaching-plate, as is shown in both Figs. 1 and 2. By reason of the two brackets being of unequal length, and the upper one the longest, when an arm is carried to a rearward position substantially parallel with the side of the rear wheel, as shown in Fig. 1, the lower portion of the arm will be considerably raised from the ground.

The body and brace 22 of each rest-arm are preferably connected by cross-braces 23, which are made as light as possible consistent with strength, and since bicycles are of different heights the body of each rest-arm A is preferably made in a manner to provide for its lower extremity A' being removed from the body of the arm. The aforesaid lower extremity A' is bifurcated, and between its members a wheel 24 is journaled.

As shown in Fig. 5, the lower extremity of the lower portion of a rest-arm A is provided with a socket 25, adapted to receive a stud 26, formed upon the upper end of the bifurcated section A' of the arm, and the abutting portions of the two sections of the arm are exteriorly threaded to receive a sleeve 27, adapted to hold these two sections firmly together, the sleeve being threaded correspondingly to the arm.

Each rest-arm is connected with the rear extension of the attaching-plate to which it belongs through the medium of two links 28 and 29. These links are pivotally connected, the link 28 being likewise pivotally attached to the main portion of an arm, and the link 29 being pivoted, preferably, to the outer extremity of the said rear extension of the attaching-plate. A third link 30 is connected with the two links 28 and 29, preferably by the same pivot-pin uniting them, and the link 30 is longer than the rear links 28 and 29 and is carried forwardly, as shown best in Fig. 2, and a guide-pin 31 is secured upon the upper face of the longer link 30, being adapted to travel in engagement with a horizontal and substantially bowed guide-bar 32, secured upon the lateral extensions from the attaching-plate crossing the vertical member thereof, as shown in both Figs. 1 and 2. The forward end of the link 30 is pivotally connected with a bar 33, held to slide in a guide 34, secured upon the forward extremity of the forward lateral branch of the attaching-plate. The bar 33, which may be termed a "connecting-bar," is connected by a universal joint 35 with a second connecting-bar 36, and the said connecting-bar is made to pass through a guide 37, secured upon the central brace 15 of the frame, and the intermediate connecting-bar 36 is united by a universal joint 38 with a third connecting-bar 39, and this latter connecting-bar, which is longer than the others, is carried upward substantially parallel with the forward lower brace 12 of the frame to a pivotal connection with the lower end of a shifting-lever 40, the latter being fulcrumed upon a support preferably attached to the steering-post 11 of the frame, and the movement of this lever is guided by causing a pin 41 or its equivalent to enter and move in a segmental slot 42, which is also secured to the said steering-post. The movement of the forward connecting-bar 39 and the intermediate connecting-bar 30 is controlled by a guide-arm 43, pivotally connected with the said connecting-bar at its universal joint 38, and is likewise pivotally connected with a bracket 44, attached to the forward lower brace 12 of the frame, which also carries a plate 45, having a segmental guide-slot 46, in which a pin 47 on the guide-arm 23 has movement.

The rest-arms and mechanism controlling the same are duplicated at each side of the bicycle, the guides 37 for the forward intermediate connecting-bars 36 being shown in Fig. 3, wherein it will be seen that the two guides are placed face to face and are provided with clamping-braces 48, secured by bolts 49 or their equivalents to the frame of the machine.

In operation, when the bicycle is on the road for ordinary purposes, the shifting-levers 40 are in a vertical position, as shown in Fig. 1, having been carried forwardly, whereupon the steadying-arms will have been carried to the side of the wheel and up from the ground, thereby not interfering in the least with the progress of the machine. If in descending a steep hill a brake is required, the arms A may be brought forward to any desired extent, and by reason of the wheel 24 engaging with the ground the motion of the machine will be more or less checked, and in the event the rider desires the wheel to remain stationary by carrying the shifting-levers 40 in direction of the saddle the arms A will be brought outward at an angle to the rear wheel, as shown in Fig. 2, and the rider may then sit comfortably on the wheel, the wheel remaining stationary. When the arms are spread out, as shown in Fig. 2, balancing the bicycle, a beginner may ride with confidence, and as confidence in the machine is acquired the arms may be carried to the rear and out of engagement with the ground.

The rear links 28 and 29, together with the forwardly-extending link 30, operating each of the rest-arms, form a toggle connection between the arms, their supports, and the shifting-levers.

Having thus described my invention, I claim as new and desire to secure by Letters Patent—

1. In a device of the character described, the combination of a bicycle, a plate attached at one side thereof, a rest-arm pivotally mounted in said plate and arranged when swung upon its pivot in one direction to contact at its free end with the ground, and when swung in the other direction to be raised out of contact with the ground, links connecting said arm with the plate, said links being pivotally connected, a shifting-lever fulcrumed on the frame, and a forwardly-extending link connected with the above-mentioned links at the pivot-points thereof and coupled at its forward end to the shifting-lever, substantially as set forth.

2. In a device of the character described, the combination of a bicycle, a plate secured thereto and comprising a vertical member and a horizontal member, the vertical member being provided at its upper and lower ends with projecting perforated brackets, the lower bracket having its perforation arranged nearer the frame of the bicycle than the perforation of the upper bracket, a rest-arm held in an inclined position and having an inclined pivot engaging the perforations in the brackets of the plate, said rest-arm being adapted when swung in one direction to engage the ground and when swung in the other direction to be raised out of contact with the ground, links pivotally connected together and connecting said rest-arm with the rear end of the horizontal member of the said plate, a connecting-rod mounted to slide on the forward end of the horizontal member of the plate, a link connecting the rear end of said connecting-rod to the links at the pivotal connection between the same, and a shifting-lever fulcrumed on the frame and connected to the forward end of said connecting-rod, substantially as set forth.

FRANZ KAMPF.

Witnesses:
 J. FRED. ACKER,
 C. SEDGWICK.